United States Patent [19]
Ford et al.

[11] 3,746,988
[45] July 17, 1973

[54] MEANS FOR MEASURING SPEED OR DISTANCE

[75] Inventors: Eric Harold Ford, London; Brian Christopher Tate, Downham, Bromley, both of England

[73] Assignee: Lumenition Limited, London, England

[22] Filed: Jan. 5, 1971

[21] Appl. No.: 104,070

Related U.S. Application Data

[63] Continuation-in-part of Ser. No. 864,230, Feb. 26, 1969, abandoned.

[30] Foreign Application Priority Data

| Feb. 29, 1968 | Great Britain | 9,945/68 |
| Feb. 28, 1969 | France | 6905420 |
| Feb. 27, 1969 | Germany | P 19 09 886.3 |
| Feb. 26, 1969 | Italy | 858457 A/69 |
| Feb. 28, 1969 | Japan | 45/15258 |
| Feb. 26, 1969 | Sweden | 2644/69 |
| Feb. 28, 1969 | Canada | 044239 |
| Feb. 28, 1969 | Austria | 51256 |

[52] U.S. Cl. ............. 324/175, 250/231 SE, 250/233
[51] Int. Cl. ........................................... G01p 3/48
[58] Field of Search ............... 324/175, 161, 172, 324/162; 250/233; 307/311; 73/185, 187, 194 E, 229, 230, 231; 330/19; 250/231 SE

[56] References Cited
UNITED STATES PATENTS

| 3,421,103 | 1/1969 | Nolde | 330/19 |
| 3,156,115 | 11/1964 | Adelmann | 324/175 |
| 3,559,065 | 1/1971 | Grundy | 324/175 |

OTHER PUBLICATIONS

Wireless World – December, 1969, p. 575.
J. I. P. Jones, A Portable Sensitive Anemometer with Proportional D.C. Output and a Matching Wind Velocity Component Resolver, J. Sci. Instr. 1965–42, pp. 414–417.

*Primary Examiner*—Michael J. Lynch
*Attorney*—Larson, Taylor & Hinds

[57] ABSTRACT

A device for generating and utilizing voltage pulses for determining the revolutions per minute of a rotating shaft or the number of complete cycles per minute performed by a reciprocating or oscillating shaft, having a solid state radiation source, a semi-conductor element sensitive to the radiation and an opaque member having an aperture therein to permit radiation to reach the element for generating a voltage pulse, the opaque element being driven in synchromism with the rotating, reciprocating or oscillating shaft, whereby by fast switching and electronic summation of the voltage pulses the revolutions or cycles can be counted.

14 Claims, 6 Drawing Figures

PATENTED JUL 17 1973

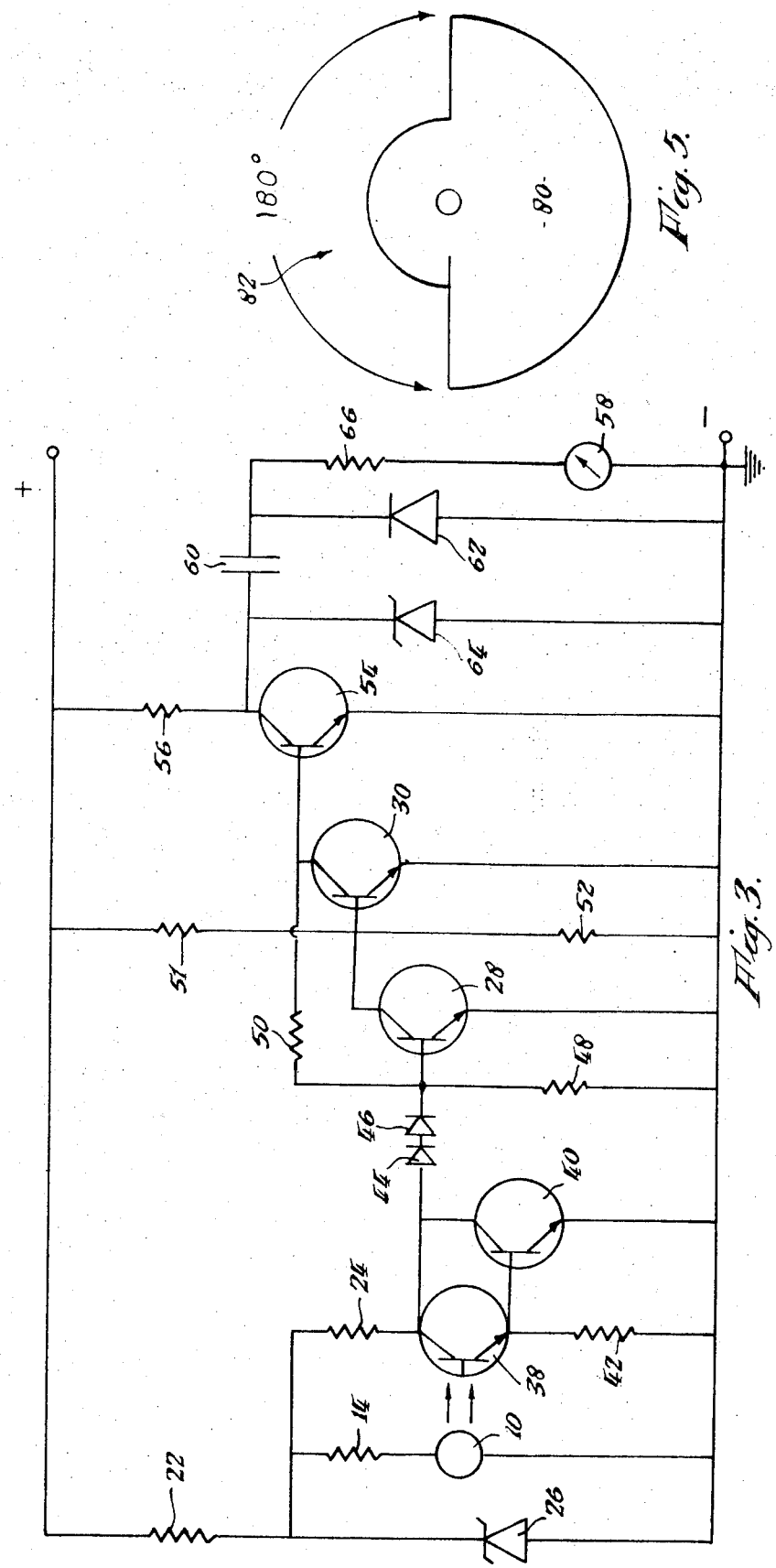

3,746,988

MEANS FOR MEASURING SPEED OR DISTANCE

CROSS REFERENCE

This application is a continuation-in-part application of Ser. No. 864,230 filed on Feb. 26, 1969 in the names of ERIC HAROLD FORD and BRIAN CHRISTOPHER TATE, which is now abandoned. More specifically it relates to improvements in the device for generating voltage pulses for determining the revolutions per minute of a rotating shaft or the number of complete cycles performed per minute by a reciprocating or oscillating shaft and the utilization of the pulses so generated to effect a very accurate measurement.

DESCRIPTION OF THE PRIOR ART

U.S. Pat. No. 2,084,267 discloses an ignition system using the rotation of the engine to drive a shutter past a light source so as to interrupt a light beam reaching a photo-cell. The photo-cell controls an input to an amplifier in accordance with the light pulses reaching it. The amplifier pulse output is fed to the spark plugs via a distributor.

SUMMARY OF THE INVENTION

Since the device for generating the voltage pulses in order to determine the revolutions, oscillations or reciprocations of the shaft concerned has to be mounted near mechanical machinery, it is very important that the correct functioning of the device is not affected by vibrations. This is particularly the case if the device is used to measure the speed or engine R.P.M. of an automobile.

It is therefore an object of the present invention to improve on the prior art constructions by including solid state elements for the radiation source and detector.

It is a further object of the invention to provide means for the utilization of the generated voltage pulses whereby the pulses are made to fast switch in an inverse manner a cascade arrangement of solid state elements and are then summated to give a reading on a meter which is directly proportional to the speed or engine R.P.M. of the automobile.

It is yet a further object of the invention to provide an alternative type of opaque element to interrupt the electro-magnetic radiation.

According to the present invention there is provided a device for generating voltage pulses for determining the revolutions per minute of a rotating shaft or the number of complete cycles per minute performed by a reciprocating or oscillating shaft, including a semiconductor element sensitive to electromagnetic radiation which will switch on or conduct when exposed to radiation and switch off when the radiation is cut off; a solid state radiation source; an opaque element positioned between the radiation source and the semiconductor element; said opaque element having a single aperture; means for moving the opaque element in timed relation to the rotating, reciprocating or oscillating shaft; a transistorized amplifier connected to the output of the semiconductor element, said amplifier having a plurality of stages, the semiconductor and each stage of the amplifier being arranged to switch inversely in cascade whereby a voltage pulse is produced every time the electro-magnetic radiation is either presented to or cut off from the semiconductor element regardless of the speed of rotation, reciprocation or oscillation of the shaft.

Preferably the solid state radiation source is a gallium arsenide lamp. The semiconductor element may be either a photo-transistor or a photo darlington pair.

The amplifier means preferably has two or three stages. The solid state radiation source and the semiconductor element may both be provided with a stabilized voltage across them. Preferably, the stabilized voltage is provided by a zener diode connected in parallel therewith.

In addition means may be provided for summating the output from the amplifier in order to obtain a direct reading of speed or distance.

BRIEF DESCRIPTION OF THE DRAWINGS

The present invention will now be described in greater detail by way of example with reference to the accompanying drawings, wherein:

FIG. 3 is a circuit diagram of an amplifier and summator circuit for providing a direct measurement of speed or distance from the output of the photo-transistor shown in FIG. 1;

FIGS. 4 and 5 are diagrammatic views of alternative types of opaque element with a cut out portion to transmit the electro-magnetic radiation.

DESCRIPTION OF THE PREFERRED EMBODIMENTS

Figure 1:
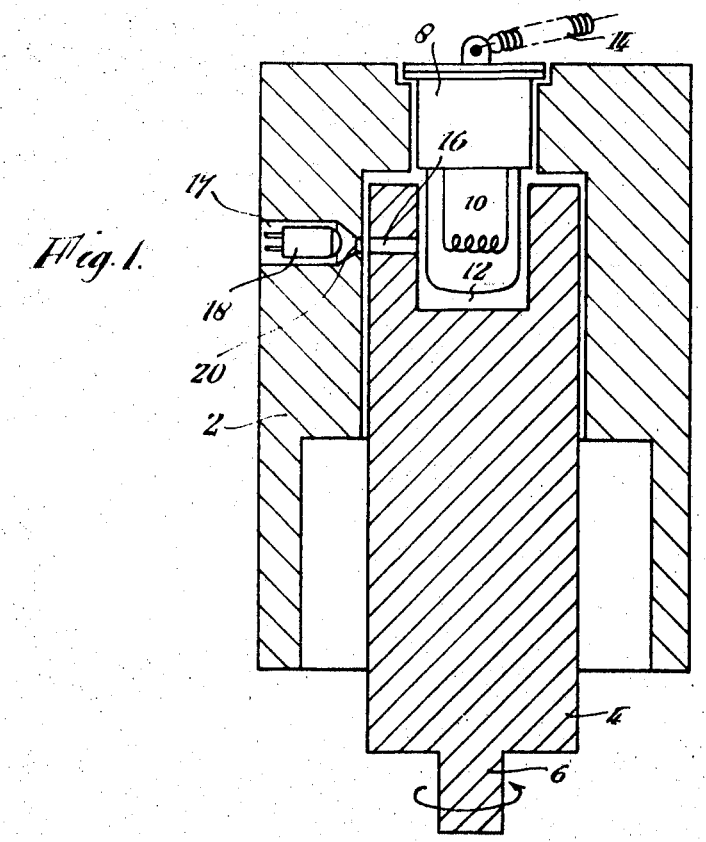
FIG. 1 shows a device for generating a voltage pulse for the measurement of the speed of rotation of a shaft.

Referring to FIG. 1 of the drawings, the device comprises a stator 2 surrounding a rotor 4. The rotor 4 is connected to the shaft whose revolutions per minute are to be measured through the shaft 6. Centrally located in the top of the stator 2 there is provided a bulb holder 8 containing a filament lamp 10 or gallium arsenide infra-red lamp. The lamp 10 projects inside a cylindrical cup 12 which is bored axially into the top of the rotor 4. The lamp 10 is derated by being connected in series with a resistor 14. The annular wall of the rotor 4 in the region of the cylindrical cup 12 has a small circular hole 16 bored in it.

In a chamber 17 in the wall of the stator 2 there is arranged a photo-transistor or light sensitive semiconductor device 18. The chamber 17 in which the photo-transistor 18 is housed has an aperture 20 which is at the same height as the hole 16 in the rotor 4.

In operation, each time the rotor 4 rotates the hole 16 comes into alignment with the aperture 20 for a brief instant. During this instant, light from the lamp 10 is received by the photo-transistor 18 which thereby causes its energization and the generation of a voltage pulse, which is thereafter amplifier (if necessary) before being applied to a binary or decimal counter stage in order to determine the number of revolutions the shaft has performed or alternatively to a suitable electronic tachometer to indicate R.P.M. The device may also be used in conjunction with speedometers, odometers, anemometers and sea speed indicators.

Figure 2:
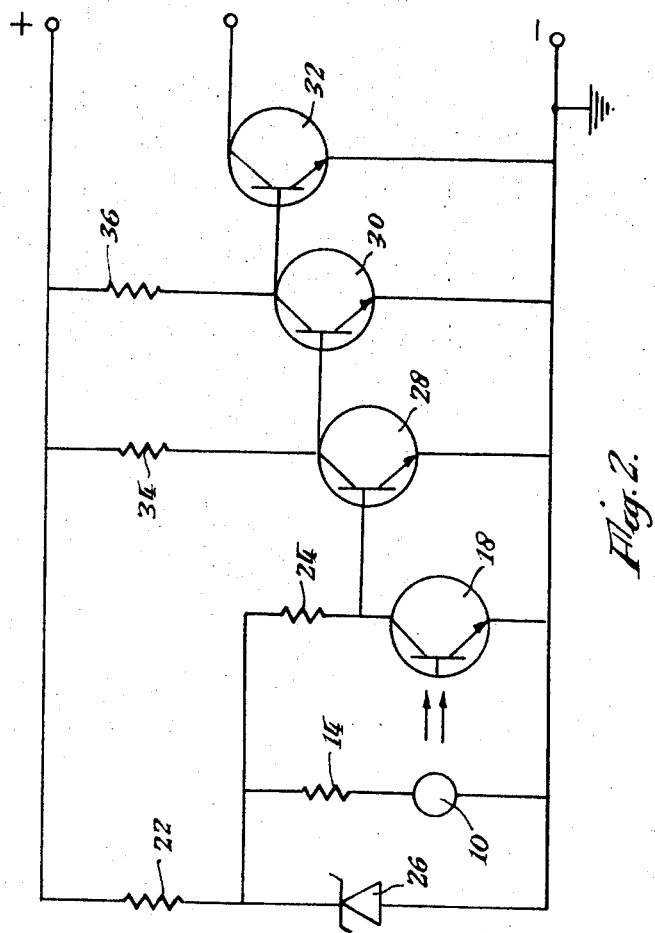
FIG. 2 is a circuit diagram of one preferred form of transistorized amplifier utilizing the output from the photo-transistor shown in FIG. 1.

Referring now to FIG. 2 of the drawings, the gallium arsenide infra-red lamp 10 and the photo-transistor 18 are supplied in parallel from a 12-volt battery (not shown) through a resistor 22. The resistor 14 is connected in series with the gallium arsenide source 10 so that the lamp is run at a derated value. A resistor 24 is connected in series with the emitter-collector path of the photo-transistor 18. A zener diode 26 is connected in parallel across the parallel circuit consisting of firstly the lamp 10 and resistor 14 and secondly the photo-transistor 18 and resistor 24. The zener diode 26 ensures that both these elements receive a stabilized voltage supply. The output from the photo-transistor 18 is applied to the base electrode of a transistor 28 forming part of a three stage amplifier which also includes transistors 30 and 32 as the second and third stages. The base electrodes of the transistors 30 and 32 are connected to the 12 volt supply through resistors 34 and 36 respectively. The photo-transistor 18 and the three transistors 28, 30 and 32 of the three stage amplifier are arranged to switch inversely in cascade as indicated by the table given below:

| Electro-magnetic radiation | 18 | 28 | 30 | 32 |
|---|---|---|---|---|
| Not interrupted | ON | OFF | ON | OFF |
| Interrupted | OFF | ON | OFF | ON |

The above described circuit is capable of very fast switching and is capable of producing an output of 1 amp at a frequency of up to 100 KHz. This output can be used to measure speed and distance of a road vehicle.

The circuit of FIG. 3 discloses an amplifier having only two stages and a summator capable of integrating the output from the amplifier in order to obtain with the aid of a micro-ammeter a direct measurement of speed or distance. In this arrangement the photo-transistor 18 is replaced by a photo darlington pair comprising a photo-transistor 38 and a transistor 40, the photo-transistor 38 having a resistor 42 connected in its emitter circuit. A pair of diodes 44 and 46 are connected in series between the commoned collector electrodes of the photo darlington pair and the base electrode of the transistor 28 constituting the first stage of the amplifier. These diodes 44 and 46 are provided to raise the voltage across the darlington pair 38–40. Resistors 48, 50, 51 and 52 are additionally included in the amplifier circuit which excludes the third stage shown in the previous embodiment.

The summator circuit includes a transistor 54, a meter 58, a capacitor 60, a diode 62, a zener diode 64 and resistors 56 and 66. The amplifying transistor 54 operates on the same inverse principle with respect to the transistor adjacent to it as is the case with all adjacent transistors in FIG. 2. The transistor 54 turns on when transistor 30 turns off and vice versa.

This operation can be briefly summarized by the following table:

| Electro-magnetic radiation | 38/40 | 28 | 30 | 54 |
|---|---|---|---|---|
| Not interrupted | ON | OFF | ON | ON |
| Interrupted | OFF | ON | OFF | OFF |

When the transistor 54 is turned on the circuit comprising the capacitor 60, the diode 62 and the collector/emitter of the transistor 54 forms a closed short circuit. Capacitor 60 thus rapidly discharges via the diode 62.

When the transistor 54 is turned off the capacitor 60 is charged by the inrush current through the meter 58 and the resistor 66. The capacitor has a small capacitance and due to the presence of the zener diode 64, every time the transistor 54 is switched off, the capacitor is rapidly charged to the zener voltage regardless of the frequency of switching. Accordingly the quantity of current passed through the meter 58 is directly proportional to the inrush current through the meter when the transistor 54 is turned OFF, i.e., during a fraction of the time that the hole 16 in the cup 12 allows infra-red radiation from the lamp 10 to fall on the photo-transistor 18. Thus the faster the repetition of the square wave input, the greater the current flow through the meter per unit time since the meter sums all the individual inrush spikes every time the transistor 54 switches OFF for a brief interval. Therefore the meter reading is directly proportional to revolutions per unit time of a rotating shaft, or the number of complete cycles per unit time performed by a reciprocating or oscillating shaft.

Figure 4:
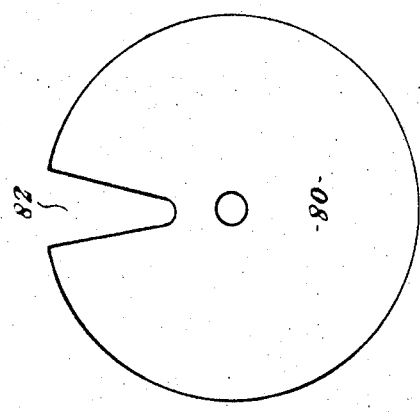

Referring to FIG. 4, instead of using the walls of the rotor cup 4 as the opaque element the photo-transistor 18 and the infra-red lamp 10 may be placed on opposite sides of an opaque disc 80 provided with a V-shaped slot 82 therein. The sides of the slot 82 are radially aligned with respect to the disc.

In the alternative construction of FIG. 5 the mark space ratio of the switching of the transistor 56 is made equal to unity by increasing the angular width of the slot 82 to 180°.

Figure 6:
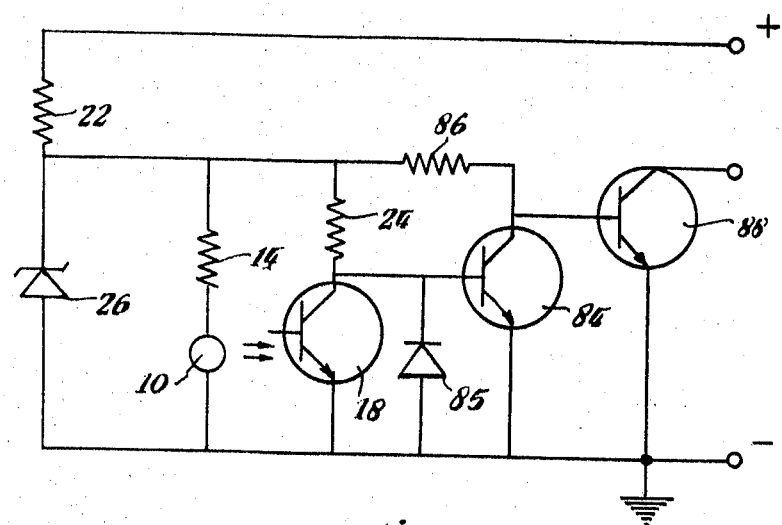
FIG. 6 is a circuit diagram of a modified form of transistorized amplifier of simpler design to that shown in FIG. 2.

Referring now to FIG. 6, the modified form of amplifier includes two transistors 84 and 88. The transistor 84 has its collector electrode connected to the +12-volt supply through a resistor 86 and the resistor 22. A shunt diode 85 is provided across the emitter-collector circuit of the photo-transistor 18 to ensure clean switching and to prevent reverse transients from causing multiple switching or oscillation. In operation a 2 mA current through the photo-transistor 18 is switched and amplified to produce 20 mA and 150 mA through the transistors 84 and 88 respectively. The circuit is otherwise identical in operation to that described in FIG. 2.

The above described device is thus not only very reliable but has a wide field of application. It may be used to determine:
  a. Engine R.P.M. of Shaft R.P.M.
  b. Road speed of a vehicle.
  c. Distance run (marine or land vehicles).
  d. Total number of revolutions, reciprocations or oscillations of any object.

What we claim and desire to secure by Letters Patent is:

1. An apparatus for determining the frequency of occurrence of a given state of a moving member comprising a semiconductor device sensitive to infra-red radiation for generating a square wave voltage pluse by switching "on" when exposed to infra-red radiation and switching "off" when the infra-red radiation is cut off; a solid state infra-red radiation source; an element opaque to infra-red radiation positioned between said source and said semiconductor device and having a single aperture therein; means for moving the opaque element in timed relation to the moving member; a transistorized amplifier having a plurality of transistor stages arranged to switch inversely in cascade between an on state and an off state so that a transistor of one stage is always conducting; means for connecting said amplifier to the semiconductor device such that the stages of the amplifier switch inversely to produce a square wave voltage pulse in synchronism with the square wave voltage pulse generated by the semiconductor device; electrical storage means charged from a source responsive to the switching off of the last stage of said amplifier; and means for measuring the average value of the inrush charging currents to said electrical storage means so as to produce a direct reading of the frequency of occurrence of the state of said moving member.

2. An apparatus according to claim 1, wherein the semiconductor device comprises a photo-transistor the base electrode of which is left unconnected, and the solid stage infra-red source comprises a gallium arsenide lamp.

3. An apparatus according to claim 2, further comprising a zener diode connected in parallel with the gallium arsenide lamp and the photo-transistor for stabilizing the voltage across said lamp and said photo-transistor, and a diode connected across the emitter-collector electrodes of the photo-transistor for ensuring clean switching thereof and for preventing reverse transients from causing multiple switching of the photo-transistor.

4. An apparatus according to claim 1, wherein said semiconductor device comprises a photo-transistor and transistor arranged as a darlington pair with commoned collector electrodes and the emitter electrode of the photo-transistor connected to the base electrode of the transistor, and wherein a pair of series diodes is connected between the commoned collector electrodes and the base electrode of the first transistor of the amplifier.

5. An apparatus according to claim 1, wherein the opaque element is a disc having a cut out portion which extends through 180°, whereby the square wave voltage generated by the semiconductor device has a mark-space ratio which equals unity.

6. An apparatus according to claim 1, wherein the last stage of said amplifier comprises a transistor which switches "on" during the "off" period in which the infra-red radiation is cut off from the semiconductor device and which switches "off" during the "on" period in which infra-red radiation reaches the semiconductor device, the means for integrating the output of the amplifier includes an ammeter, a capacitor and a diode, the diode and ammeter being connected in parallel with one another, and the capacitor being connected between the output of the last stage of the amplifier and the parallel combination of diode and ammeter so that the emitter-collector circuit of the transistor forming the last stage of the amplifier short circuits the capacitor and meter when said last stage transistor switches "on," said capacitor being charged by the current which passes through the ammeter when the transistor forming the last stage of the amplifier switches "off."

7. An apparatus according to claim 2, wherein said opaque element comprises a rotor having a cylindrical cup at one end with a single aperture therein, said gallium arsenide lamp extending into said cup and being fixed to a stator and said photo-transistor being housed in the wall of the stator in line with the rotating aperture in the cylindrical cup and said gallium arsenide lamp.

8. In combination, a road vehicle and an apparatus for determining the engine revolutions of the road vehicle including a semiconductor device sensitive to infra-red radiation for generating a square wave voltage pulse by switching on when exposed to the infra-red radiation and switching off when the infra-red radiation is cut off therefrom; a solid state infra-red radiation source; an element opaque to infra-red radiation having a single aperture formed therein, said opaque element being positioned between said source and said semiconductor device; means for moving the opaque element in timed relation to the engine revolutions of said road vehicle; a transistorized amplifier having a plurality of inversely switching transistor stages, means for connecting said transistorized amplifier to the semiconductor device such that the semiconductor device and the transistor stages of the amplifier switch inversely in cascade between an "on" state and an "off" state so that a transistor of one stage is always conducting so as to produce a square wave voltage pulse every time a pulse occurs from the output of the semiconductor device; and electrical storage means charged from a source responsive to the switching off of the last stage of said amplifier; and means for measuring the average value of inrush charging currents to said electrical storage means so as to produce a direct reading of the engine revolutions of the vehicle.

9. The combination according to claim 8, wherein the means for effecting a summation of the pulses from the output of the amplifier includes an ammeter, a capacitor, a diode, a zener diode and a transistor, means for connecting said capacitor in series with said amplifier across the collector-emitter path of the transistor, means for connecting said diode across said ammeter and zener diode across the collector-emitter path of the transistor so that the transistor causes short circuiting of the capacitor when said transistor is turned "on" during the "off" period in which the infra-red radiation is cut off from the semiconductor device, said capacitor being charged by the current which passes through the meter when the transistor switches "off" during the "on" period in which the infra-red radiation reaches the semiconductor device.

10. The combination according to claim 8, wherein said opaque member comprises a rotor having a cylindrical cup at one end with an aperture in the wall thereof, said solid state source being fixed to a stator and being housed within said cup, and the semiconductor device being housed in the wall of the stator in line with the solid state source and in the same plane as the aperture in the wall of the cup.

11. The combination according to claim 8, wherein the semiconductor device comprises a photo-darlington pair and the infra-red radiation source comprises a gallium arsenide lamp, said combination further comprising a zener diode connected in parallel with a first series arm comprising the gallium arsenide lamp and a resistor, and a second series arm comprising a photo-darlington pair and a resistor, the three armed parallel circuit so formed being connected in series with a resistor across a D.C. voltage source.

12. An apparatus for determining the speed of a road vehicle including a photo-transistor sensitive to electromagnetic radiation which conducts when exposed to radiation and switches off when the radiation is cut off; a solid state radiation source; a disc, having a cut away, portion positioned between the source and the photo-transistor; means for rotating the disc in relation to engine speed so that radiation from said source passing through the cut away portion of said disc to said photo-transistor causes a corresponding series of square wave voltage pulses to be produced at the output of the photo-transistor; a transistorized amplifier having a plurality of transistor stages, the stages of said amplifier being connected so as to switch inversely in cascade in such a manner that at any one instant one transistor of the amplifier is always conducting; means for connecting the amplifier to the photo-transistor such that the output produced by the amplifier is a square wave which is in synchronism with the square wave voltage pulses produced at the output of the photo-transistor; and electrical storage means charged from a source responsive to the switching off of the last stage of said amplifier; and means for measuring the average value of the inrush charging currents to said electrical storage means so as to provide a direct reading of the speed of the road vehicle.

13. A device according to claim 12, wherein the solid state radiation source comprises a gallium arsenide infra-red lamp.

14. A device according to claim 12, wherein the cut away portion of the disc extends through 180° of the circumference of the disc.

* * * * *